United States Patent [19]

Schlaikjer et al.

[11] Patent Number: 5,318,600
[45] Date of Patent: Jun. 7, 1994

[54] METHOD FOR MAKING A LITHIUM ANODE FOR AN ELECTROCHEMICAL CELL

[75] Inventors: Carl Schlaikjer, Concordm; James Epstein, Sharon, both of Mass.; Sean T. Riley, Portsmouth, R.I.

[73] Assignee: Battery Engineering, Inc., Hyde Park, Mass.

[21] Appl. No.: 94,956

[22] Filed: Jul. 23, 1993

[51] Int. Cl.$^5$ ............................................. H01M 4/04
[52] U.S. Cl. ................................................. 29/623.5
[58] Field of Search ........................... 29/623.1, 623.5; 427/115; 429/192, 218, 48, 194; 72/711

[56] References Cited

U.S. PATENT DOCUMENTS

| | | | |
|---|---|---|---|
| Re. 31,489 | 1/1984 | Sekido et al. | 429/191 |
| 3,528,856 | 9/1970 | Ovshinsky | 429/27 |
| 3,615,835 | 10/1991 | Ovshinsky | 429/50 |
| 4,624,902 | 11/1925 | Neufville | 429/218 |
| 4,707,422 | 11/1987 | deNeufville | 429/48 |
| 4,888,258 | 12/1989 | Desjardins et al. | 429/218 X |

OTHER PUBLICATIONS

Schwager and Muller Electrochemical Soc. Abs. 295 p. 478 Electrochem. Soc. Extended Abstracts vol. 82-2 1982.

Thevenin and Muller Study of the Li/LiN$_3$ Electrode in an Organic Electrolyte pp. 2650-2656 Electrochem. Soc. 134 1987.

*Primary Examiner*—Anthony Skapars
*Attorney, Agent, or Firm*—Shlesinger, Arkwright & Garvey

[57] ABSTRACT

This disclosure relates to a method for making a lithium anode for an electrochemical cell and more particularly to a method of extruding a ribbon of lithium into a reaction chamber for reacting the surface of the extruded lithium metal with nitrogen to produce a coating of lithium nitride on the surface of the lithium metal ribbon.

22 Claims, 3 Drawing Sheets

METHOD FOR MAKING A LITHIUM ANODE FOR AN ELECTROCHEMICAL CELL

This invention is concerned with a method for making an anode for an electrochemical power source and more particularly with a method for producing a lithium anode having a thin lithium nitride protective coating formed thereon.

BACKGROUND

It has been found, that in a rechargeable electrochemical power source provided with a pure metallic lithium negative electrode which cell contains an organic based liquid or polymer type of an electrolyte, that a reaction between this lithium anode and the electrolyte takes place that produces a thin passivating film over the surface of the anode that diminishes the electrochemical activity of the cell by causing a voltage delay on start-up after a storage period.

To counteract this passivating effect caused by the reaction between the lithium anode and the electrolyte, it has been suggested that an inert coating be produced in place on the surface of the lithium metal anode to insulate the anode from the electrolyte. Such a coating however must also be electrically conductive when in contact with the electrolyte. A nitride coating on the lithium has been found to be such a coating that effectively insulates the lithium metal of the anode from a direct contact with the electrolyte that produces the passivating coating. and yet the nitride coating is electrically conductive to such an extent as to not inhibit the electrochemical reaction in the cell when it has been put in use.

Various methods for producing such a desired lithium nitride protective coating on a lithium metal anode for use in an electrochemical cell have been mentioned in the prior art including nitriding the lithium by a solution deposition procedure, vapor deposition, and rapid quench techniques. These coating methods contemplate the application of the coating either by means of a simple lithium nitride deposition or by chemically reacting the surface of a lithium metal anode to produce the surface coating or electrically depositing a coating in-situ on the lithium metal to be used as the anode. In all of these known prior coating disclosures, for coating a lithium metal with a lithium nitride layer on an anode, the coating is described as being applied to the surface of an existing lithium metal that is then to be used for the anode.

It is known that lithium is a highly reactive metal and when exposed to the normal atmosphere quickly acquires a perceptible oxide coating. The existence of even a very thin layer of the oxidized lithium on the surface of the metal to be coated as taught in the prior art will interfere with the production of the nitride coating and with the ultimate serviceability of the hoped for protective nitride coating on the lithium metal anode being prepared for use in an electrochemical power cell.

The present invention provides an improvement on these known coating procedures for making lithium/lithium nitride coated anodes for use in electrochemical power sources that use organic based or polymer electrolytes.

BRIEF DESCRIPTION OF THIS INVENTION

The present improvement in the manner of producing a lithium nitride film on the surface of a lithium metal strip being prepared for use as an anode in such an electro-chemical cell takes advantage of the well known very highly reactive characteristic of pure lithium metal in a process to produce the desired lithium nitride coating on pure lithium metal. This is accomplished by delivering a pure lithium metal ribbon directly from an extrusion die into a reaction chamber and substantially instantaneously exposing the newly formed highly reactive surface to nitrogen whereby to form a thin pure lithium nitride coating over the entire surface of the ribbon. The nitride coating is formed immediately on the surface of the freshly extruded lithium metal before the extruded metal can come in contact with any other gas with which it reacts before it comes in contact with the nitrogen.

IN THE DRAWINGS

DETAILED DESCRIPTION

Figure 1:
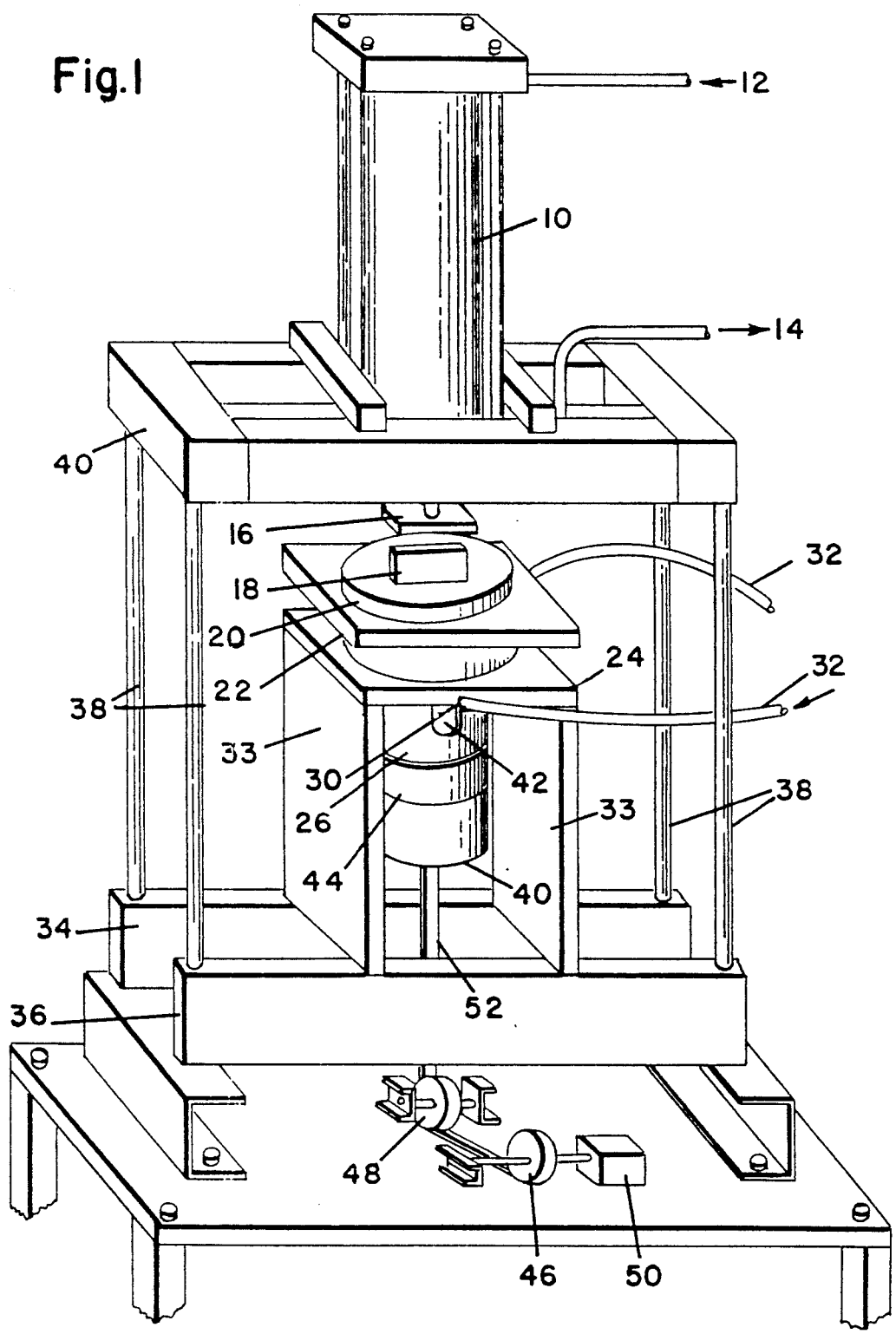
FIG. 1 is a diagrammatic perspective representation of an apparatus in which the method of this invention is adapted to be performed.
Figure 2:
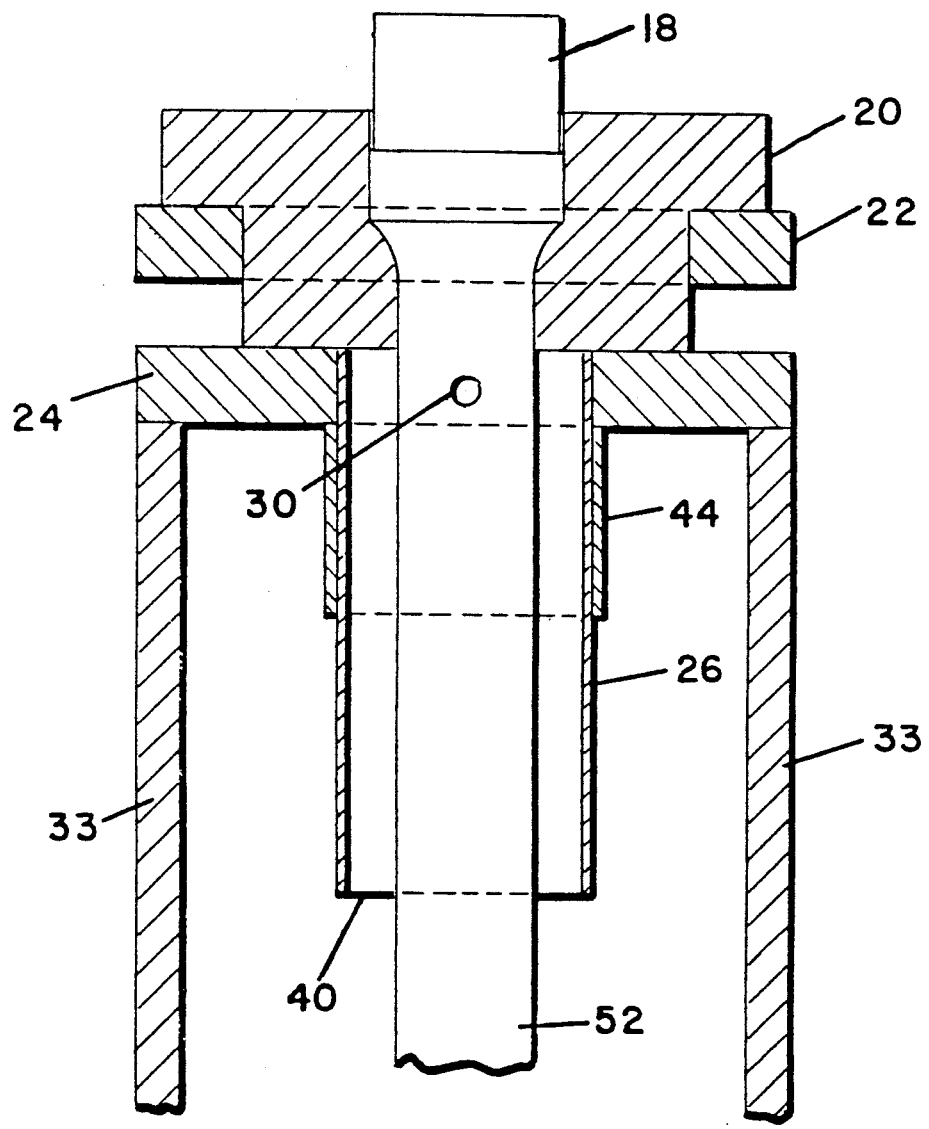
FIG. 2 is a front view of the extrusion die assembly mounted within the apparatus shown in FIG. 1.

An extruding apparatus in which this process may be carried forward is shown in the drawings wherein a high pressure, hydraulically actuated means is shown that is operative to force the pure lithium metal through an extrusion nozzle directly into a reaction chamber in which the highly reactive fresh surface of the lithium is immediately brought into contact with nitrogen gas to form the desired lithium nitride coating over all of the exposed surface area of the extruded metal.

An example of such an extruding apparatus is shown in FIG. 1. It is mounted upon a suitable table and includes the hydraulic cylinder 10 having a high pressure oil feed inlet 12 and an oil outlet 14. The hydraulic cylinder typically contains a piston that drives the piston head 16 into engagement with the upper end of the extrusion plunger 18. This plunger cooperates with the extrusion die 20 has a stroke of about 1" into the two part extrusion die assembly 20 that is held together by the collar 22. The extrusion die assembly is carried on and sealed against a header 24 and is also sealed against the upper end of a reaction chamber that is defined by the wall 26 so that the outlet of the extrusion die feeds the extruded metal directly into the reaction chamber. The header 24 is provided with passageways 28 and 30 each of which is adapted to be connected to a nitrogen source through conduits 32 as shown in FIG. 1 the reaction gas being delivered by these passages into the reaction chamber as will be described more fully below. The header 24 is mounted on spacer blocks 33 to hold the lower end 40 of the reaction chamber wall 26 suitably spaced above the support beams 34 and 36 of the extrusion apparatus assembly. These beams are connected at their opposite ends with the vertically disposed legs 38, the upper ends of which are made integral with the frame structure 40 upon which the hydraulic cylinder 10 is mounted.

Figure 3:
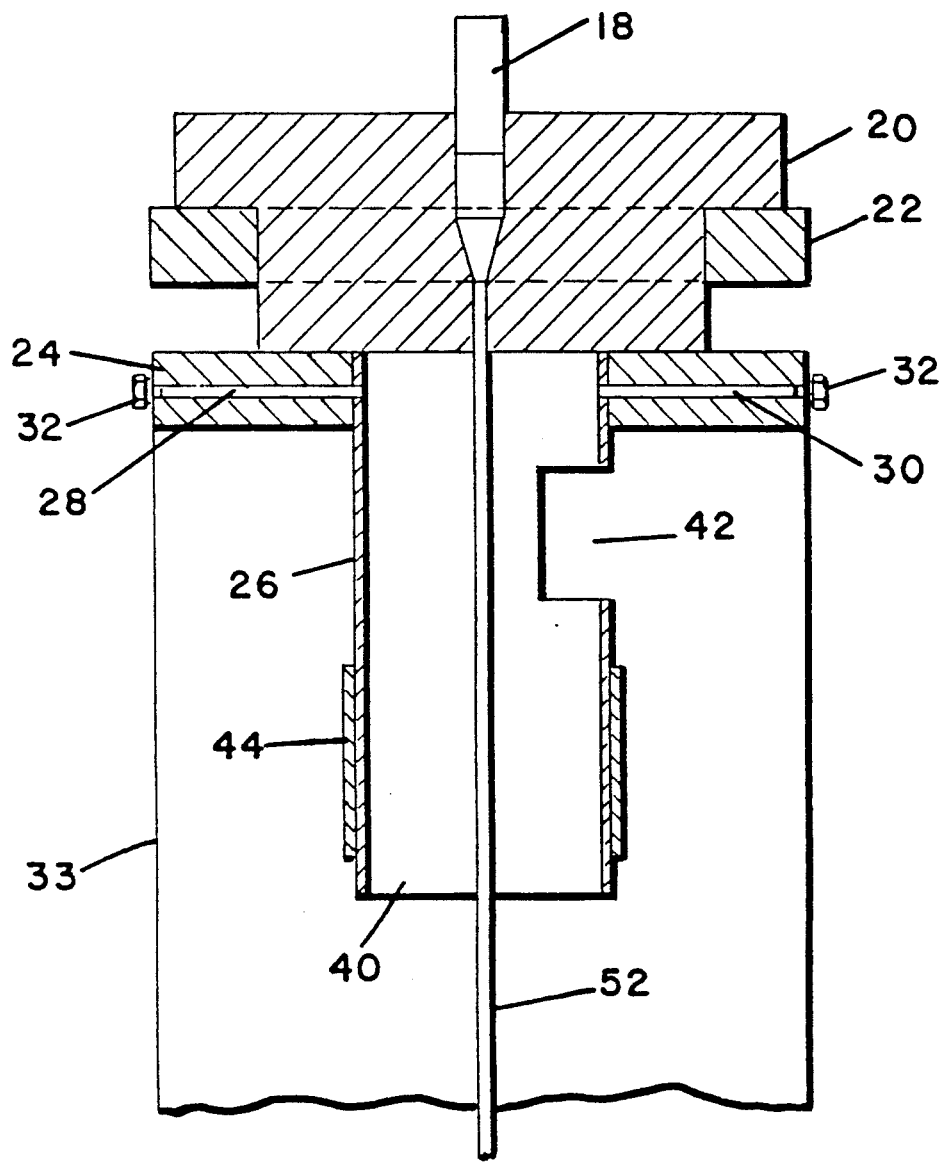
FIG. 3 is a side view of the apparatus illustrated in FIG. 2.

The reaction chamber 26 is provided with an access opening 42 and a longitudinally sliding shroud that can be moved upwardly to close the opening 42 when the reaction process is proceeding. Referring to FIG. 3, it is seen that the infeed passages 28 and 30 are shown connected to the upper end of the reaction chamber to feed the reaction gas or gasses into the chamber under pressure to fill the chamber with the desired reaction medium to the exclusion of any outside air in the reaction chamber.

With a high degree of pressure of up to as much as 1,200 pounds per square inch in the extrusion chamber, pure lithium metal can be extruded through an extrusion die to form a lithium ribbon that is 1.5" wide by 0.012" thick an for the purpose of making a ribbon of a size suitable for use as an anode in an electrochemical cell. A supply of the pure lithium metal in the form of lithium foil cut to match the size of the extrusion plunger can be extruded through the die or a solid ingot of a proper size can be used to supply the pure lithium metal needed.

In the hydraulic press described above having the plunger 18 that measures ⅞" by 1¾" with a 1" stroke, the lithium metal can be continuously extruded through such a die with a pressure of up to 1,200 pounds per square inch to cause the metal to issue from the die at a constant rate of about 0.5" to 1" per second. It is desirable to maintain a gentle tension on the ribbon flowing from the extrusion die to prevent the formation of ripples and curves in the lithium ribbon and for this purpose a suitable tensioning means including a take up spool 46 shown in FIG. 1 is provided that can be connected through a suitable take up cable draped around the roller 48 can be connected with the leading end of the extruding lithium ribbon as it issues from the extrusion die. The take up spool is driven be a motor 50 and is designed to produce just the right tension on the cable to put a tension on the issuing lithium ribbon 52 coming from the extrusion die. The hand opening 42 is provided for the purpose of attaching the end of the tension cable to the leading end of the lithium ribbon as soon as it begins to flow from the die. After the cable is connected to the lithium ribbon the movable door 44 is 10 closed over the opening to maintain a closed reaction chamber filled with the reaction gas in which to expose the highly reactive surface of the freshly extruded ribbon to the nitrogen in the surrounding atmosphere within the reaction chamber.

The process is carried on in a dry room in which the atmosphere is maintained with an ambient relative humidity of 2% or less at a temperature of 70° F. The exit from the extrusion die is enclosed in the housing 26 that is provided the infeed passages 28 and 30 that direct the desired pure reaction gas against all the surfaces of the ribbon immediately as the walls of the pure lithium metal surfaces issue from the mouth of the extrusion die. The reaction gas is preferably heated to a temperature of around 100° C. as it is blown into the reaction chamber to contact the surface of the ribbon and this surface is exposed to the nitrogen in the reaction gas for a period of from 6 to 12 seconds.

When a pure lithium metal supply composed either of a plurality of pieces metal foil cut to fit the size extrusion die camber or if a solid ingot is placed in the die chamber to be extruded under the conditions outlined above, the nitrided lithium ribbon 52 produced by the extrusion die and reacted in the chamber 26, appeared to be uniformly covered with a thin, blue-black layer of lithium nitride.

It is suggested that the gas within the housing be nearly pure nitrogen but an inert gas such as argon may be used to dilute the atmosphere within the housing to make a thinner lithium nitride coating on the metal being reacted with the nitrogen. Lithium nitride coatings have been produced on the extruded lithium metal when an infusion of as much as 95% of argon gas present. The temperature within the reaction chamber is preferably maintained at about 100° C. but good results have been realized within the range of from 30° C. to 100°.

After the ribbon exits from the reaction chamber the formation of the nitride coating ceases. The coated ribbon can then be stored in vacuum desiccators in a dry room to protect the coated lithium from exposure to air until the finished product is ready for use.

While the above describes the preferred form of our invention it is possible that modifications thereof may occur to those skilled in the art that will fall within the scope of the following claims.

We claim:

1. A method of forming a lithium anode for use in an electrochemical power source, the lithium anode having a coating of lithium nitride covering its surface comprising extruding a ribbon of solid lithium metal into a reaction chamber that is supported in a dry room in which the ambient humidity is maintained at no more than a 2% relative humidity at 70° F., surrounding said extruded ribbon with a reacting gas containing nitrogen, and reacting the surface of said extruded ribbon with said nitrogen to form the desired lithium nitride layer on the surface of the lithium anode.

2. A method as in claim 1 comprising performing said extrusion step in said reaction chamber supported in a in a dry room at a temperature in the range of near 70° F.

3. A method as in claim 2 wherein the ambient humidity in said dry room is maintained at no more than a 2% relative humidity at a temperature of 70° F.

4. A method as in claim 1 comprising performing said extrusion in said reaction chamber supported in a dry room in which the ambient atmosphere is maintained in a range of from 30° C. to 100° C.

5. A method of claim 1 comprising extruding said lithium metal into said reaction chamber through an orifice that produces a ribbon that is about 1.5" wide and 0.012" thick.

6. A method as in claim 1 comprising extruding said lithium metal into said reaction chamber through an orifice to produce a ribbon that is about 1.5" wide by 0.012" thick that issues into a nitrogen containing reaction gas enclosed in said reaction chamber that is supported in said dry room in which room the ambient atmosphere has a humidity that is maintained at no more than a 2% relative humidity at a temperature of 70° F.

7. A method as in claim 1 comprising extruding said lithium metal into said reaction chamber through an orifice to form a thin foil ribbon moving at a constant rate of from 0.5" to 1" per second.

8. A method as in claim 7 wherein the temperature in said dry room is maintained in a range of near 70° F.

9. A method as in claim 7 comprising performing said extrusion step into said reaction chamber supported in said dry room in which the ambient humidity in said room is maintained at no more than a 2% relative humidity at 70° F.

10. A method as in claim 6 wherein the temperature in said reaction chamber is maintained within a range of from 30° C. to 100° C.

11. A method as in claim 1 wherein said atmosphere contains as much as 95% of an inert gas.

12. A method as in claim 11 wherein said inert gas is argon.

13. A method as in claim 11 wherein said extruded ribbon is about 1.5" wide and 0.012" thick.

14. A method as in claim 11 wherein said ribbon is about 1" wide and 0.012" thick.

15. A method as in claim 13 wherein said reaction gas is maintained at a temperature within a range of from 30° C. to 100° C.

16. A method as in claim 11 wherein said reaction gas is maintained at a temperature within a range of from 30° C. to 100° C.

17. A method of making a lithium anode for use in an electrochemical power source, the lithium anode being uniformly coated with a layer of lithium nitride comprising extruding a ribbon of pure lithium metal from a die into a closed raction chamber that is supported in a dry room, said dry room having an atmosphere in which the humidity is maintained at no more than a 2% relative humidity at a temperature of 70° F., maintaining a gentle tension on said ribbon as it is being extruded, and directing a reaction gas that contains nitrogen against said ribbon as it issues from said die.

18. A method as in claim 17 wherein said reaction gas is heated as it is directed against said ribbon.

19. A method as in claim 17 wherein said reaction gas is heated to a temperature within a range of from 30° C. to a temperature of 100° C.

20. A method as in claim 17 wherein said reaction gas is substantially pure nitrogen that is maintained in contact with said ribbon for a period of at least from 6 to 12 seconds.

21. A method as in claim 19 wherein said reaction gas is maintained in contact with said ribbon for a period of at least from 6 to 12 seconds.

22. A method as in claim 20 wherein said reaction gas is maintained at a temperature within a range of from 30° C. to 100° C.

* * * * *